United States Patent [19]
Eisenhammer et al.

[11] Patent Number: 5,912,045
[45] Date of Patent: Jun. 15, 1999

[54] PROCESS FOR PRODUCING SELECTIVE ABSORBERS

[76] Inventors: Thomas Eisenhammer, Lauthstrasse 35, D-80999, Munchen; Helmut Schellinger, Ickstattstrasse, D-70469, Munchen; Miladin Lazarov, Winzererstrasse 138, D-80797 Munchen, all of Germany

[21] Appl. No.: 08/975,556

[22] Filed: Nov. 21, 1997

[30] Foreign Application Priority Data

May 22, 1995 [DE] Germany ............................ 195 18 731
May 22, 1996 [WO] WIPO ..................... PCT/DE96/00934

[51] Int. Cl.⁶ ....................................................... B05D 5/12

[52] U.S. Cl. .......................... 427/125; 427/123; 427/126.3; 427/126.4; 427/162; 427/216; 427/218; 427/219; 427/405; 427/427; 427/429; 427/435

[58] Field of Search ....................................... 427/162, 123, 427/125, 126.3, 126.4, 216, 218, 219, 427, 435, 429, 405

*Primary Examiner*—Bernard Pianalto
*Attorney, Agent, or Firm*—Albert P. Halluin; Howrey & Simon

[57] ABSTRACT

This invention relates to a process for producing a selective absorber which contains one or more layers of a non-homogeneous material (cermet), the non-homogeneous material having been produced by means of a sol-gel process.

18 Claims, 1 Drawing Sheet

PROCESS FOR PRODUCING SELECTIVE ABSORBERS

The present application is a U.S. nationalization pursuant to 35 U.S.C. 371 of PCT/DE96/00934 filed on May 22, 1996 which is in turn based on German Patent Application No. 195 18 731.8 filed on May 22, 1995.

This invention relates to a process for producing selective absorbers. The selective absorber of the present invention contain a non-homogeneous material (cermet) which is produced by means of the sol-gel process and comprise a non-conductive matrix and dielectric matrix, respectively, having conductive particles incorporated into the matrix.

Cermets consist of a non-conductive or dielectric matrix into which conductive or metallic particles having diameters typically of 5–30 nm are incorporated. Cermets have been used as selective absorbers for solarthermal applications for a relatively long time (G. A. Niklasson and C. G. Granqvist, J. Appl. Phys. 55, p. 3382 (1984)). The cermets represent a non-homogeneous material which has a high absorption degree in the shortwave solar spectral range (about 350–1500 nm), while the absorption degree is low in the relatively longwave infrared spectral range. The industrial production of cermets for solarthermal applications by means of electroplating processes (e.g. nickel-pigmented $Al_2O_3$) or PVD processes is known. Examples include molybdenum in $SiO_2$ or $Al_2O_3$ (M. Gorlin et al., in Modeling of Optical Thin Films II, M. R. Jacobsen (ed.), Proc. SPIE 1324, p. 214 (1990)) as well as steel in amorphous carbon α-C:H (B. Window and G. L. Harding, Solar Energy 32, p. 609 (1984)).

In connection with the electroplating process wastes which are problematic for the environment result from the electroplating baths used. The PVD process is technically complicated because of the vacuum systems required and thus expensive. While most substrate geometries can easily be coated with the electroplating processes, this is expensive with the PVD process. Furthermore, it is rather poorly possible to obtain the little layer thickness tolerance necessary for optical layers on uneven substrates by means of the PVD process. Also, dimensions and shapes of the conductive particles as well as the volume fractions thereof in the matrix can be controlled only with difficulty and in limited fashion by these processes. However, these factors exert a great influence on the optical properties of a cermet. It is also impossible to embed conductive particles which are composed in a chemically complicated manner in the matrix. In the above-mentioned processes, the selection of the conductive particles is strongly restricted, e.g. to particles comprising pure elemental metals (e.g. gold, copper, nickel, chromium, molybdenum, iron) or steel particles. Another problem is represented by the oxidation and diffusion stabilities of the selective absorbers used often at elevated temperatures and also in the air. The selective absorbers easily degenerate by oxidation of the metal particles within the matrix.

Therefore, it is an object of the present invention to provide a process for producing a selective absorber, which can be carried out easily and in environmentally safe fashion and avoids the problems listed above.

This object is achieved by the processes according to the present invention.

The present inventors have discovered that it is advantageous to use the sol-gel process for producing selective absorbers based on cermets, for the provision of the cermets.

The sol-gel process is a process which has been known since the 1940's, particularly for the production of dielectric ceramics and coatings having electrochromic properties (e.g. Pach et al., J. of European Ceramic Society, 12 (1993), pp. 249–255; Avellanieda C. et al., SPIE Vol. 2255, pp. 38–51 (1994); Roy, R., Science Vol. 238, pp. 1664–1669 (1987)). The usual steps for a sol-gel process include preparing an initial solution, applying of the solution onto a substrate, gelling this solution and applying the gel to a substrate, respectively, and changing the gel into a solid body, e.g. by a drying or sintering process. For example, it is possible to produce a humidity sensor by means of such a process. For this purpose, carbon black particles may be dispersed in a solution obtained by hydrolyzing silicon alkoxide in a certain amount of water, the resulting sol (initial solution) allowed to fully gel on an insulating substrate, and the resulting gel dried and sintered (Patent Abstracts of Japan C-646, Vol. 13, No. 466 (Oct. 20, 1989)).

By means of the process of the present invention, it is possible to provide a selective absorber based on a non-homogeneous material (cermet) which contains components composed in any way but defined, conductive and dielectric. The dimensions, shapes and volume fractions of the conductive particles can be varied widely in defined manner. The coating of non-planar substrates is also possible without problems.

According to the present invention, a non-conductive or dielectric matrix in which conductive particles are embedded is produced by the sol-gel process. For carrying out the sol-gel process, e.g. niobium chloride ($NbCl_5$) is dissolved in butanol and mixed with sodium butoxide ($Na(OBu)_n$) under a refluxing operation. As a result, $Nb(OBu_n)_5$ and NaCl form. After separating the NaCl, a precursor sol is obtained which is converted into a sol by mixture with glacial acetic acid. Another possibility of producing a sol (initial solution) consists e.g. in producing an about 20% water-aluminum hydroxide (boehmite) and mixing this mixture with $HNO_3$ (pH=about 2)) at 55° C. α-$Al_2O_3$ seed crystals are incorporated into $HNO_3$ and added to the boehmite hydrogel. The two solutions are thoroughly mixed.

The most differing dielectrics may be converted into an initial solution such way as a person skilled in the art is familiar, respectively, inter alia $Al_2O_3$, $TiO_2$, $ZrO_2$, $Y_2O_3$, $SiO_2$, $Ta_2O_5$, $WO_3$, $V_2O_5$, $Nb_2O_5$ or $CeO_2$, namely in a pure form or as a mixture. According to the present invention, conductive components (particles) are inserted in the initial solution used in the sol-gel process, and a dispersion is formed thereby. However, it is also possible to introduce the conductive particles into the forming gel which is not yet too viscous. According to the present invention, conductive components are understood to mean materials which have a specific electrical dc resistance of below 100,000 $\mu\Omega$cm at room temperature (20° C.). Materials such as quasi-crystalline alloys (D. Shechtmann et al., Phys. Rev. Lett. 58 (1984), 1951; "Quasi-crystals", C. Janot, Oxford University Press, Oxford, (1992)), which have a specific resistance of about 5,000 $\mu\Omega$cm, or suitably doped superconducting perovskites, which have a specific resistance of about 10000 $\mu\Omega$cm, are mentioned by way of example. Some alloys such as $Al_2Ru$ also have high specific resistances of 50000 $\mu\Omega$cm. In contrast, dielectric materials having a specific resistance (in a pure state) above $10^{10}$ $\Omega$m are insulating. The optimum properties in the infrared to visible spectral range differ correspondingly. In wide sections of the wavelength range, dielectrics have a small imaginary portion k of the complex refractive index $\tilde{n}=n+ik$, typically below 0.01. Conductive materials have a high k>0.1 for wavelengths above the plasma wavelength. The materials suitable for selective absorbers have such a high k also in the solar spectral range.

According to the present invention, the conductive particles preferably have dimensions ranging from $(0.5\ nm)^3$ [$=0.125\ nm^3$] to $(1\ \mu m)^3$ [$=1\ \mu m^3$], especially preferably ranging from $(2\ nm)^3$ to $(100\ nm)^3$.

Particles comprising largely pure elements can be used as conductive particles, however, a minor contamination of up to 5 atom %, e.g. with oxygen or carbon, is possible. The conductive particles may consist of tungsten, chromium, platinum, gold, silver, nickel, cobalt, iron, titanium, zirconium, molybdenum, hafnium, aluminum, palladium, vanadium, or tantalum. The particles may also consist of a metal alloy or conductive oxide ceramic. Metal alloys are understood to mean materials which, with the exception of minor impurities (below 5 atom %), comprise the above-mentioned metals or semi-conductors (C, Ge, Si). The class of quasi-crystalline materials is especially suited as a metal alloy, since the quasi-crystalline materials have high chemical stability and extraordinary optical properties. Quasi-crystalline materials which comply with the following summation formulae are especially preferred:

$Al_a Cu_b Fe_c X_d$ wherein $8 \leq b \leq 30$, $8 \leq c \leq 20$, $d \leq 12$ and $a+b+c+d=100$ $Al_a Cu_b Co_c X_d$ wherein $8 \leq b \leq 25$, $10 \leq c \leq 20$, $d \leq 12$ and $a+b+c+d=100$ $Al_a Pd_b Mn_c X_d$ wherein $15 \leq b \leq 30$, $7 \leq c \leq 17$, $d \leq 5$ and $a+b+c+d=100$ $Ga_a Mg_b Zn_c X_d$ wherein $30 \leq b \leq 35$, $50 \leq c \leq 55$, $d \leq 5$ and $a+b+c+d=100$ $Al_a Cu_b Li_c X_d$ wherein $10 \leq b \leq 15$, $25 \leq c \leq 35$, $d \leq 5$ and $a+b+c+d=100$ $Al_a Cu_b Ru_c X_d$ wherein $8 \leq b \leq 25$, $10 \leq c \leq 20$, $d \leq 12$ and $a+b+c+d=100$ In the above formulae, X is a contamination such as e.g. Na, O or N or one or more of the above-listed metals. Especially preferred are quasi-crystalline materials of the following summation formulae: $Al_{65}Cu_{20}Ru_{15}$, $Al_{62}Cu_{20}Co_{15}Si_3$, $Al_{63.5}Cu_{24.5}Fe_{12}$, $Al_{64}Cu_{24}Fe_{12}$, $Al_{64}Cu_{22}Fe_{14}$, $Al_{60}Cu_{10}Li_{30}$, $Al_{65}Cu_{10}Li_{30}$, $Al_{65}Cu_{20}Co_{15}$, $Ga_{16}Mg_{32}Zn_{52}$ or $Al_{70}Mn_9Pd_{21}$.

Other preferred conductive materials include conductive metal oxides, metal nitrides or metal carbides as well as mixtures thereof. Especially preferred are ZrN, TiN, HfN, CrN or $Ti_x Al_{1-x} N$ (wherein $0.2<x<0.8$), WC, ZrC, TiC or HfC or an oxynitride $MeN_x O_y$ (wherein Me=titanium, zirconium or hafnium and $0.2<x<1.5$; $0.2<y<2.2$; $0.4<(x+y)<2.2$) as well as oxidic metals such as $RuO_x$ and $IrO_x$ (A. K. Goel et al., Phys. Rev. B 24, p. 7342, (1981)) and the perovskites conductive with corresponding doping. They also comprise the frequently superconducting oxide ceramics, preferably having the following compositions:

$(Me)_2 CuO_4$ wherein Me: Ca, Sr, Ba, Na, K, lanthanides $MeBa_2 Cu_3 O_7$ wherein Me: Y, lanthanides $Bi_2 Sr_2 Ca_n Cu_{n+1} O_{2n+6}$ wherein n=0, 1, 2

$Ta_2 Ba_2 Ca_n Cu_{n+1} O_{2n+6}$ wherein n=0, 1, 2

The perovskites are strongly absorbing in the short-wave spectral range and often appear black. They have a high oxidation stability and are obtained in an oxidation process in air at temperatures around 800° C.

Mixtures of the various conductive particles increase the possibilities of varying the optical properties.

The conductive particles may be produced, e.g. by spraying or evaporation in an inert gas atmosphere (helium, neon, argon, krypton, xenon) or a reactive atmosphere comprising oxygen or nitrogen or a mixture of the gases at a pressure ranging from 1 Pa to 10,000 Pa, preferably 10 Pa to 1,000 Pa. In this connection, small particles having diameters ranging from several nanometers to about 70 nanometers form. Other particles may be produced, e.g. by grinding, it being possible to separate the particles by screening techniques, air separation or electrostatic deposition processes into suitable size classes. These processes include the advantage that particles having almost any composition can be produced, and the sizes can be adjusted in a defined manner. Conductive materials having perovskite structure may be produced in a solid-state reaction at elevated temperatures. The resulting sintered part consists of individual nanocrystalline grains, it being possible to widely vary the shape and size of the resulting particles by the selection of process parameters in a solid-state reaction. The particles may be separated by grinding in a mortar.

The conductive particles are preferably coated in a processing step with a dielectric (e.g. oxidic or nitridic) layer prior to the addition to the initial liquid and the gel, respectively. This may happen in a reactive atmosphere comprising oxygen and/or an inert atmosphere consisting of nitrogen or noble gases or a mixture of these gases by oxidation processes. However, the coating may also be effected in another sol-gel process. The coating has several advantages. The coating may facilitate a homogeneous dispersion of the particles in solutions without agglomeration of the particles. Furthermore, a dense, chemically stable oxide skin can increase the chemical stability of the conductive particles and prevent the diffusion of the conductive particles into the dielectric component. Stable $Al_2 O_3$ layers are especially preferred for the purpose of oxidation stabilization. In this way, conductive particles can be made resistant to chemical influences and to diffusion with dense dielectric layers. This is especially advantageous when the dielectric or non-conductive component, which is produced in the actual sol-gel process, is not dense enough to protect the embedded conductive particles from oxygen supply, which may cause oxidation of the conductive particles. Also, the properties of the non-homogeneous materials (cermets) can be varied in an even wider range when the layer surrounding the conductive particles comprises a material other than the dielectric component. The properties of the non-homogeneous materials can be further optimized advantageously with respect to the application as selective absorbers by means of the additional refractive index skip adjustable by this.

The volume fraction of the conductive particles in the non-homogeneous material can be adjusted by the process according to the invention in a wide range of 0.1 to 60%, preferably 1 to 40%, the properties of the cermet being varied correspondingly. Materials produced in the sol-gel process usually have cavities ranging from 0 to 20%.

The non-homogeneous materials (cermets) can be applied by means of painting, spraying, immersion or centrifugation onto a reflector substrate. However, for this purpose it may be necessary to use conventional additives so as to adjust the viscosity and surface tension of the solution and gel respectively. This enables the coating of complex substrate geometries, particularly of tubes which are used as selective absorbers e.g. for the solarthermal generation of electricity by means of parabolic fluted power stations. For selective absorbers at least one layer of the non-homogeneous material produced by means of the sol-gel process is applied onto a reflector substrate, the substrate containing or consisting of the metals copper, aluminum, molybdenum, silver, gold or alloys thereof. Application to different substrates coated with highly reflecting layers is also possible. The selective properties may be achieved with cermet layer thicknesses ranging from 1 nm to 10 μm, preferably from 10 nm to 1 μm. In this connection, a selective absorber having high absorption $α_s$ in the solar spectral range results, while the absorption in the relatively long-wave infrared spectral range is low for wavelengths above about 2 μm, i.e. the reflection is high. High reflection in the infrared spectral range serves for suppressing radiation loss due to thermal radiation, i.e. the selective absorber has a small emission degree ε. The selective properties may be further improved when several layers having differing portions of conductive particles are used. According to the present invention it is possible to produce corresponding layer systems by several applications of layers having differing volume fractions of conductive particles. In addition, purely dielectric layers may additionally be used to improve the selectivity, i.e. to increase the solar absorption degree.

The invention is now explained in more detail with reference to the figures, which show:

The invention is now described in more detail with reference to the examples provided below:

EXAMPLE 1

Figure 1:
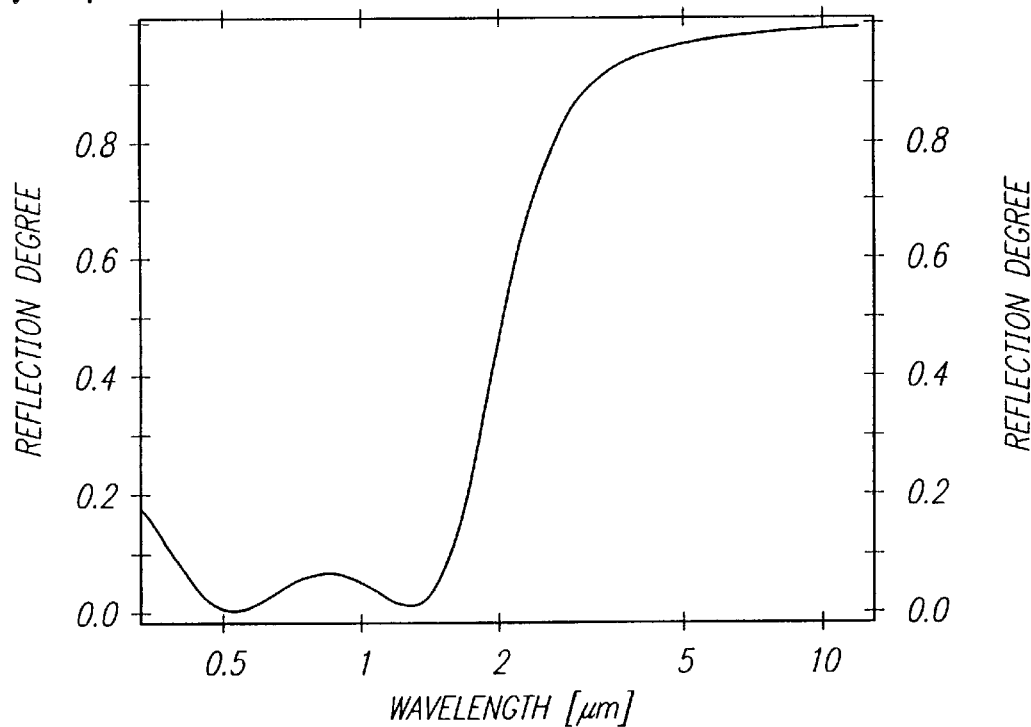
FIG. 1 represents reflection degree of a first absorber ($Al_{65}Cu_{20}Ru_{15}$ particles in an $Al_2O_3$ matrix on a copper substrate having an $Al_2O_3$ anti-reflection layer) as a function of the wavelength.

Quasi-crystalline conductive particles of a material having the composition $Al_{65}Cu_{20}Ru_{15}$ are produced by ultragrinding. The resulting particles are oxidized at 400° C. in oxygen at a pressure of 100 Pa, and an about 8 to 10 nm thick oxide skin ($Al_2O_3$) forms on the surface of the particles, no further oxidation of the particles taking place in a further treatment at 500° C. in air at normal pressure. The particles are dispersed in a solution suitable for the production of a sol of $Al_2O_3$ (e.g. described in R. Roy, Science 238, p. 1664 (1987)). Since the surfaces of the quasi-crystalline particles are coated with $Al_2O_3$, a homogeneous dispersion of the particles in the solution is not a problem. The liquid is applied by spraying it onto a copper substrate, and a cermet layer comprising quasi-crystalline particles in an $Al_2O_3$ matrix forms by a tempering treatment at 600° C. This layer has a thickness of 110 nm and a volume fraction of 30% of quasi-crystalline material. In another processing step, a pure $Al_2O_3$ layer having a layer thickness of 60 nm is applied which serves as an anti-reflection layer. FIG. 1 shows the reflection degree of this layer system as a function of wavelength.

EXAMPLE 2

Figure 2:
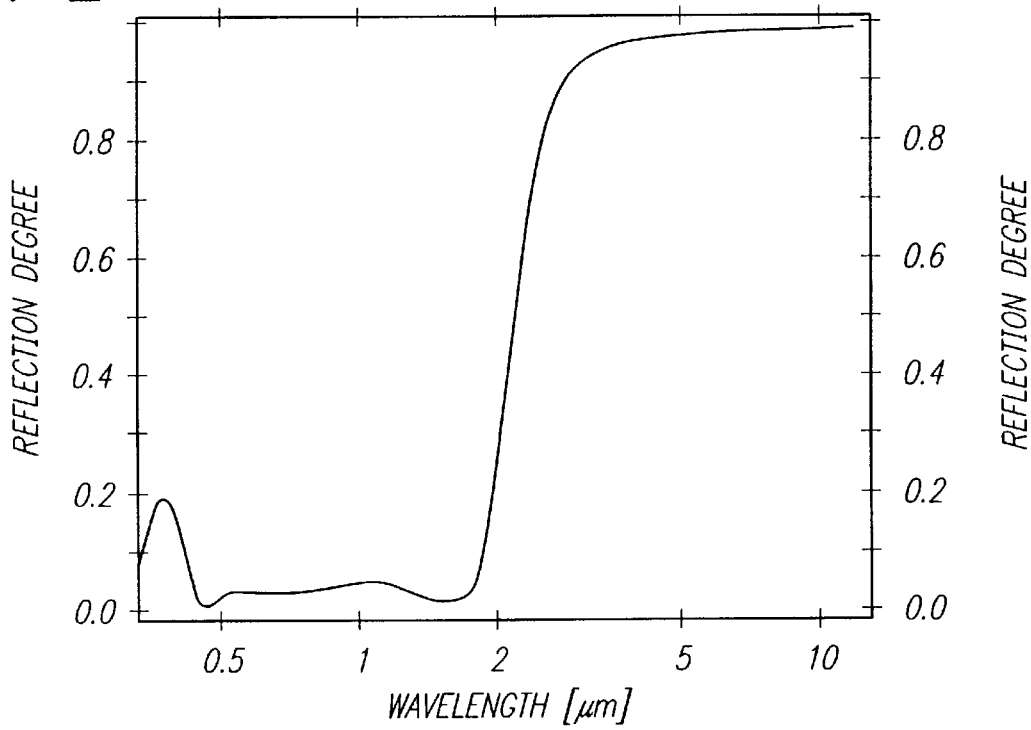
FIG. 2 represents the reflection degree of a second absorber (TiN particles in an $Al_2O_3$ matrix on a copper substrate having an $Al_2O_3$ anti-reflection layer) as a function of the wavelength.

Conductive TiN particles are produced by grinding using an average grain diameter of 20 nm. The conductive particles are dispersed in a solution suitable for the production of $Al_2O_3$ (e.g. described in R. Roy, Science 238, p. 1664 (1987)). A copper substrate is coated with the liquid by centrifugation. A cermet layer having a volume fraction of 20% of conductive particles as well as a layer thickness of 130 nm forms by a tempering treatment at 600° C. In another processing step, a pure $Al_2O_3$ layer having a layer thickness of 60 nm is applied as an anti-reflection layer. FIG. 2 shows the reflection degree of this layer system as a function of wavelength.

We claim:

1. A process for producing a selective absorber comprising one or more thin layers on a reflector substrate wherein at least one of the layers comprises a non-homogeneous material of a non-conductive or dielectric matrix containing conductive particles, comprising the steps of:

(a) dispersing conductive particles having a specific electrical resistance less than 100,000 μΩcm at 20° C. in an initial solution of a sol-gel process or admixing conductive particles whose specific electrical resistance is less than 100,000 μΩcm at 20° C. to a gel forming during a sol-gel process; and (b) applying the resulting dispersion or gel of step (a) to a reflector substrate.

2. The process according to claim 1, wherein the initial solution comprises a non-conductive or dielectric material selected from the group consisting of $Al_2O_3$, $TiO_2$, $ZrO_2$, $Y_2O_3$, $SiO_2$, $Ta_2O_5$, $WO_3$, $V_2O_5$, $Nb_2O_5$ and $CeO_2$ or a mixture thereof.

3. The process according to claim 1, characterized in that the conductive particles used are those having an imaginary portion k of greater than 0.1 for the complex refractive index of the conductive particles within the solar wavelength range of 350 to 1500 nm.

4. The process according to claim 1, wherein the conductive particles have an imaginary portion k of greater than 0.1 for the complex refractive indes within the solar wavelength range of 350 to 1500 nm.

5. The process according to claim 1, wherein at least 95 atom % of the conductive particles comprise only one metallic element selected from the group consisting of tungsten, chromium, platinum, gold, silver, nickel, cobalt, iron, titanium, zirconium, molybdenum, hafnium, aluminum, palladium, vanadium and tantalum.

6. The process according to claim 1, wherein the conductive particles comprise a metal alloy, a conductive metal oxide, a metal nitride or carbide or mixtures thereof or oxide ceramics.

7. The process according to claim 6, wherein the metal alloy is at least partially present in a quasi-crystalline phase and the volume fraction of the quasi-crystalline phase in the conductive particles exceeds 40%.

8. The process according to claim 6, characterized in that the metal alloy is at least partially present in a quasi-crystalline phase, the volume fraction of the quasi-crystalline phase in the conductive particles exceeding 40%.

9. The process according to claim 6, wherein the conductive nitride is ZrN, TiN, HfN, CrN or $Ti_xAl_{1-x}N$ (wherein 0.2<x<0.8) and the conductive carbide is WC, ZrC, TiC or HfC or an oxynitride $MeN_xO_y$ wherein Me=titanium, zirconium or hafnium and 0.2<x<1.5; 0.2<y<2.2; 0.4<(x+y)<2.2.

10. The process according to claim 6, wherein the conductive oxide is $RuO_x$, $IrO_x$, a highly doped semi-conductor or an oxidic ceramic having a perovskite structure.

11. The process according to claim 1, wherein a mixture of conductive particles having differing compositions is used.

12. The process according to claim 1, wherein the conductive particles are produced by evaporation or spraying in an inert gas atmosphere or a reactive atmosphere comprising oxygen or nitrogen or a mixture of the gases at a pressure ranging from 1 Pa to 10,000 Pa.

13. The process according to claim 1 wherein the conductive particles are coated with a dielectric layer prior to the dispersion in the initial liquid or gel.

14. The process according to claim 1, wherein the dispersion and gel are applied onto the reflector substrate by painting, spraying, immersion or centrifugation.

15. The process according to claim 1, wherein at least one layer of the non-homogeneous material on the reflector substrate has a thickness of 10 nm to 10 μm.

16. The process according to claim 1, wherein the reflector substrate onto which at least one layer comprising a non-homogeneous material as absorber layer is applied comprises the metals copper, aluminum, molybdenum, silver, gold or the alloys thereof.

17. The process according to any one of claims 1 to 16 further comprising the step of applying at least one absorber and/or antireflection layer onto the reflector substrate.

18. A selective absorber produced according to the process of any one of claims 1 to 16.

* * * * *